United States Patent [19]

LaGoy

[11] Patent Number: 5,116,005
[45] Date of Patent: May 26, 1992

[54] COMPACTLY FOLDING TRIPOD SUPPORT SYSTEM FOR GUITARS

[76] Inventor: R. Gregory LaGoy, 223 Aulii Dr., Pukalani, Hi. 96768

[21] Appl. No.: 621,379

[22] Filed: Nov. 30, 1990

[51] Int. Cl.⁵ .............................................. F16M 11/38
[52] U.S. Cl. .................................... 248/168; 84/327; 248/188.6
[58] Field of Search ...................... 248/188.6, 434, 435, 248/168, 169, 170, 171, 188.7; 84/327, 453; 211/199, 203, 195; 403/116

[56] References Cited

U.S. PATENT DOCUMENTS

| | | | |
|---|---|---|---|
| 284,269 | 9/1883 | Bishop | 248/171 |
| 794,409 | 7/1905 | Irving | 403/116 X |
| 1,268,363 | 6/1918 | Lamont | 248/171 |
| 1,412,377 | 4/1922 | Ruzicka | 248/168 |
| 1,806,454 | 5/1931 | Goudeau | 248/168 |
| 2,238,708 | 4/1941 | Russell | 248/188.7 |
| 2,502,229 | 3/1950 | Miller | 248/168 |
| 2,630,289 | 3/1953 | Selig | 248/169 |
| 3,567,166 | 3/1971 | Grandjean | 248/170 |
| 3,921,947 | 11/1975 | Adam | 248/168 X |
| 3,958,786 | 5/1976 | Mann | 248/176 |
| 4,074,881 | 2/1978 | Bickford | 248/170 X |
| 4,582,282 | 4/1986 | Gracie | 248/167 |
| 4,691,610 | 9/1987 | Gilbert | 84/327 |

FOREIGN PATENT DOCUMENTS

260779 11/1926 United Kingdom ................ 211/203

*Primary Examiner*—J. Franklin Foss

[57] ABSTRACT

A compactly folding tripod support system for holding a resting guitar or the like in an upright, stable position. The extended legs (47, 49) radiate horizontally from a central hub (46) which includes a tapered post (45) which removably engages with a suitably equipped guitar (39). The unique geometry of the tripod allows the six leg segments to fold up under the central hub in a tight hexagonal array, thus allowing its storage in the accessory compartment of an ordinary guitar case.

2 Claims, 3 Drawing Sheets

COMPACTLY FOLDING TRIPOD SUPPORT SYSTEM FOR GUITARS

BACKGROUND

1. Field of Invention

This invention relates to guitars, specifically to a tripod support stand with a unique folding leg geometry, used to support the resting guitar sturdily in an upright position, and yet folding compactly to fit into the accessory compartment of a guitar case.

2. Description of Prior Art

Heretofore, no tripod support has been patented or produced for any purpose, whose bi-folding leg geometry has allowed the leg segments to fold into a tight hexagonal array. The two nearest patented bi-folding tripods are discussed in more detail below.

The Goudeau Folding Support for Baby Swings (U.S. Pat. No. 1,806,454) is a bi-folding tripod using a hinge arrangement between the upper and lower leg segments which dictates that, when the legs are completely folded, the three distal segments are adjacent in a triangular array, and the three proximal segments lie in a larger triangular array outside of that triangle, making the minimum overall diameter of the folded stand nearly double the minimum diameter of a similarly proportioned version of my invention.

The Grandjean Stenotype Tripod (U.S. Pat. No. 3,567,166) is a bi-folding tripod using an open channel leg section, with a pivot arrangement between proximal and distal leg segments which, while allowing compact folding, is less rigid and therefore less stable than my invention, is proportionally longer when folded than my invention, and is esthetically relatively unattractive, either in use or folded up.

Similarly, no guitar stand nor any other musical instrument stand has been patented or produced which is a tripod stand with a bi-folding leg geometry that has allowed the leg segments to fold into a tight hexagonal array. Additionally, all standing supports in use or patented for use with guitars, are devices upon which the resting guitar perches, every vulnerable to being dislodged and falling, and when ready for storage or transport, are bulky and require being carried and stored separately. Since the guitar's surface comes into direct contact with these stands, there is always the potential to mar the finish during placement and removal of the guitar. When the stands are not in use, they clutter the appearance of the floor or stage, and are easily tipped, for instance by the movement to cords. Most of the guitar stands in use today are quite similar to each other. They generally consist of a pair of supporting cradle arms holding up the guitar, and either a cradle to support the neck of the guitar, or a bumper against which the back of the guitar rests. Most designs fold to some degree. The patented prior art guitar stands cited herein are typical of the style of guitar stand currently in universal use. An exhaustive recitation of the prior art is unnecessary because there are neither functional nor apparent similarities with my invention. Those prior art stands included are for clarification of the history of guitar stands, and to provide contrast to highlight the value of my invention.

Up until the 1950's, virtually all guitars were hollow bodies acoustic guitars. It was and remains a generally unacceptable practice to drill, cut holes into, or affix hardware to such instruments. Accordingly, the guitar stands which had developed were those upon which the guitar could perch, and thus required no modification to the guitar. The subsequent widespread use of electrically amplified solid bodies guitars was accompanied by a tendency to use whatever accessories were already in wide use. Thus the guitar stands in use today were initially intended for, and are more suitable for use with hollow bodies acoustic guitars. While the prior art stands are not nearly as well suited to the task of supporting solid bodies guitars as my invention is, their inadequacies have been tolerated in the absence of an alternative.

The Gracie Supporting Stand for a Stringed Musical Instrument (U.S. Pat. No. 4,582,282) is designed for use with the hollow-bodies acoustic instruments, and suffers from two main disadvantages. First it has a relatively small footprint, making it vulnerable to being tipped over, and second, though it claims to be able to be carried in a guitar case, it does not fit into the accessory compartment, and thus rests next to the guitar, increasing the possibility of marring the guitar finish during transport.

The Mann Stand for Musical Instruments (U.S. Pat. No. 3,958,786), is adjustable and therefore somewhat more complex than other similar prior art stands, but is a good example of the typical cradle-type stands. In addition to the previously mentioned general disadvantages of the prior art, the stand must be stabilized with a foot or hand as a heavy instrument is being set on it, to prevent its tipping forward. It also requires adjustment and clamping with knurled knobs or wingnuts before it is ready for use. This is time consuming, and presents the possibility of lost parts.

The Miller Bass Viol Stand (U.S. Pat. No. 2,502,229) is a simple four legged support which remains quite bulky when folded. This stand was designed both for use while playing the bass viol, and as a resting support for the instrument. However, because of the narrow angle of taper of its support pin, which is dictated by the standard taper found in the bottom of all bass viols, once the weight of the instrument has pushed it into place, it must be hammered out. This fault may account for its commercial failure. Application of this same post and socket design to guitars would suffer similarly. Additionally, it has the same problem as the rest of the prior art concerning storage or transport: having relatively long legs and being bulky, it requires being carried and stored separately from the instrument.

OBJECTS AND ADVANTAGES

Accordingly, it is an object of my invention to provide the resting guitar with a tripod support system whose unique leg geometry allows it to fold so compactly as to fit into the accessory compartment of a guitar case.

It is another object of my invention to provide the resting guitar with a support system which does not contact the surface of the guitar. There are several other objects and advantages of my compactly folding tripod support system for guitars:

My invention provides a more secure support for the resting guitar, which does not merely perch upon my stand, but tightly engages it, and thus cannot be easily dislodged nor fall off.

The fact that my invention comes only into contact with a part or place on the guitar designed specifically for engagement means that the guitar's surface never touches its support, and so cannot be marred by it in normal use.

Whereas all commercially available stands must be transported and stored separately, my invention's three legs fold down so compactly as to allow it to fit inside the accessory compartment of a guitar case. This capacity alone makes it unique. With an ever-increasing number of pieces of equipment and accessories to take care of, this feature of my invention is most useful.

All existing stands clutter up the stage or floor when not in use, and most of them when empty are vulnerable to being tipped over by the many cords being moved around on stage. My invention, being only two or three inches high, is totally unobtrusive and nearly impossible to be overturned from instrument and speaker cords pushing against it. My invention does not have rubber feet, as do most of the stands in use, and so if it is bumped while supporting a guitar, it is likely to merely slide across the floor and less likely to tip over. Even with its small size, my invention's footprint size, and therefore stability, compares favorably with all existing and all previously patented stands. My invention will not suffer from the set-up difficulty nor the transportation annoyance which accompanies many of the prior art stands when the pivots of their folding parts become sloppy. This is because the legs on my invention have spring detents which hold them in the folded up or the extended positions.

In addition to the advantages my invention has over all existing stands in terms of its unique compactly folding leg geometry and its great stability, it has certain specific advantages over each of the existing stands referred to in the Background section.

With respect to the leg geometry of the Goudeau Folding Support (U.S. Pat. No. 1,806,454) with its resultant bulky folded up size, my invention folds very compactly.

Although the Grandjean tripod (U.S. Pat. No. 3,567,166) folds compactly, my invention's leg geometry allows its folded leg length to be shorter than the Grandjean tripod folded leg length for any specified extended leg length. The clean lines and rigid solidity of my invention contrast markedly with the less rigid and utilitarian looking Grandjean tripod.

In contrast with the smaller footprint and the larger folded size of the Gracie stand (U.S. Pat. No. 4,582,282), my invention offers a combination of stability and compactness which is unsurpassed.

With respect to the tendency of the Mann stand (U.S. Pat. No. 3,958,786) to tip forward easily when placing a heavy guitar onto the cradle arms, my invention can never become unbalanced during normal use. My invention needs no adjustment for its use, and so has none of the disadvantages associated with having knurled knobs or wing nuts which must be repeatedly tightened and loosened, and can be lost.

Relative to the Miller Bass Viol Stand (U.S. Pat. No. 2,502,229) whose bulkiness upon folding up requires its being carried separately, my invention's unique leg geometry allows it to fold in an unexpectedly compact manner. The Miller stand's narrow tapered post jams itself tightly within the standard tapered hole in all bass viols, where my invention's taper is wide enough to prevent jamming, but narrow enough to provide stability. My invention is nearly indestructible, being designed so that if stepped on, the legs will spring the small amount necessary for the base to contact the floor, without damage.

An invention which simplifies necessary tasks and imparts to a device or situation a sense of being self-contained, without the addition of unnecessary complexity or cost, has intrinsic value beyond the specific advantages it has over prior art. My invention clearly exemplifies these qualities. Further objects and advantages of my invention will become apparent from a consideration of the drawings and ensuing description of it.

DRAWING FIGURES

REFERENCE NUMERALS IN DRAWINGS

| | |
|---|---|
| 39. Guitar | 45. Post |
| 40. Guitar bottom | 46. Central Hub |
| 41. Pivot pins | 47. Inner leg segment |
| 42. Tapered socket | 49. Outer leg segment |
| 43. Soft tip | 51. Double hinge link |
| 44. Slot | 53. Hinge pin |

DESCRIPTION AND OPERATION

Figure 1:
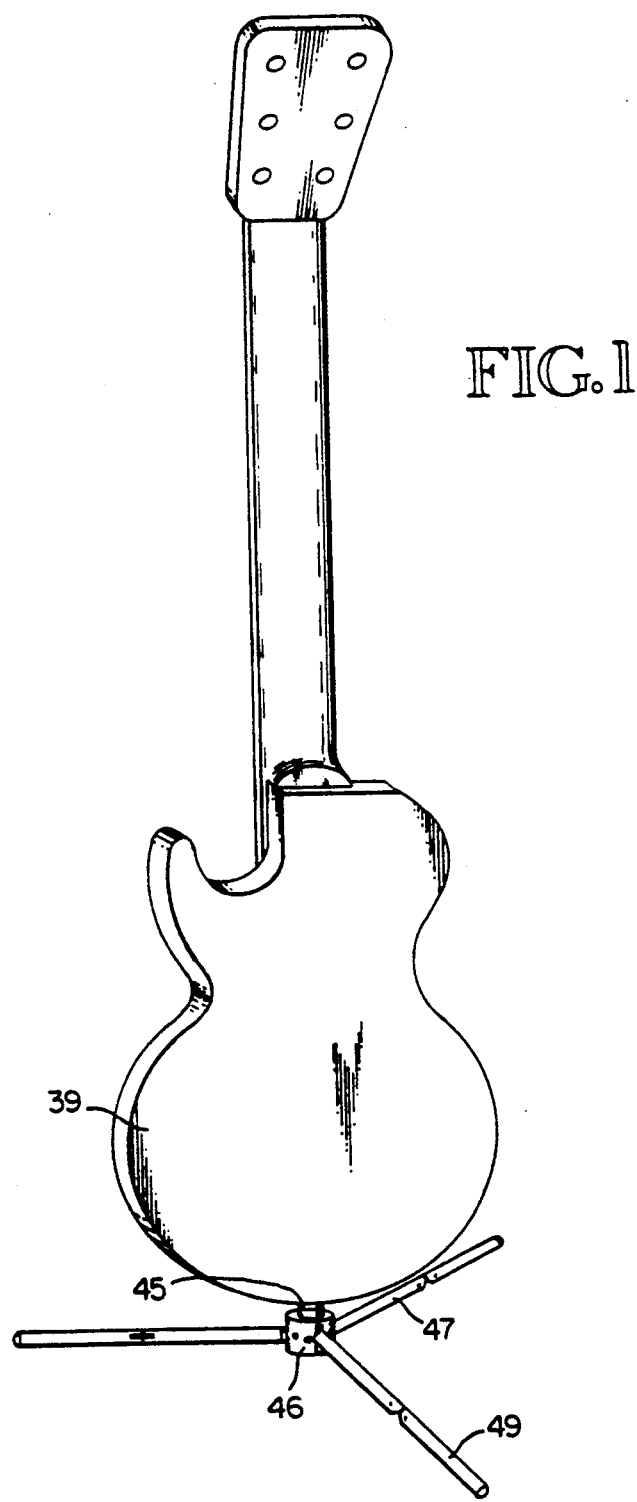
FIG. 1 is a perspective view of the invention with legs extended, supporting a resting guitar.

FIG. 1 shows the Compactly Folding Tripod Support System for Guitars supporting a resting guitar. The details of this invention and how it functions are elaborated in the following paragraphs.

Figure 2:
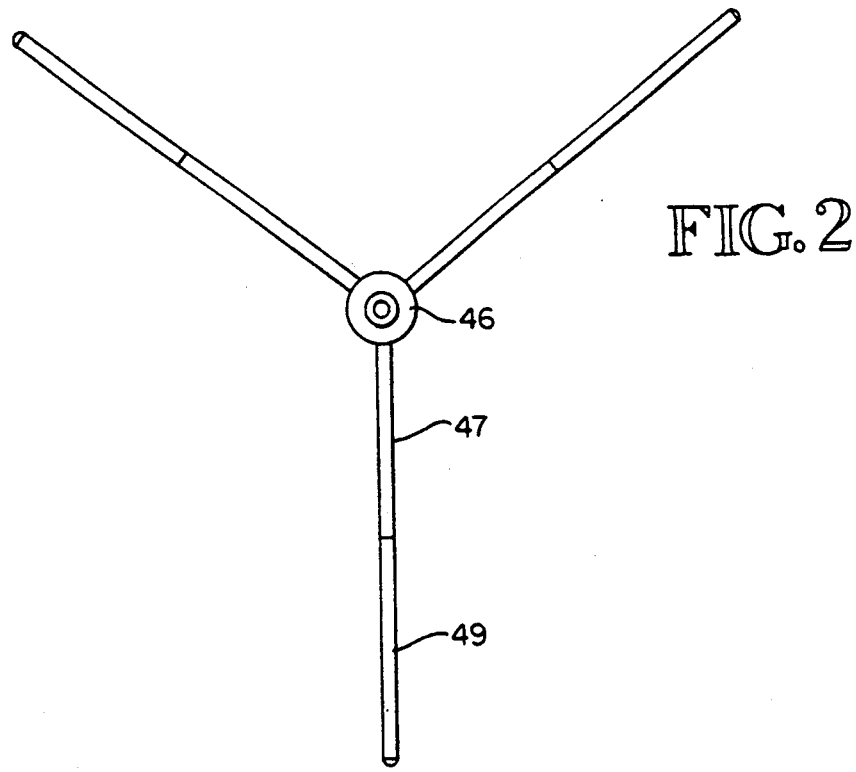
FIG. 2 is a plan view of an embodiment of the invention in which the leg axes intersect the center of the hub.

FIG. 2 is a plan view of embodiment 1 of the invention with its legs in the extended position, showing how they are radially arrayed.

Figure 3:
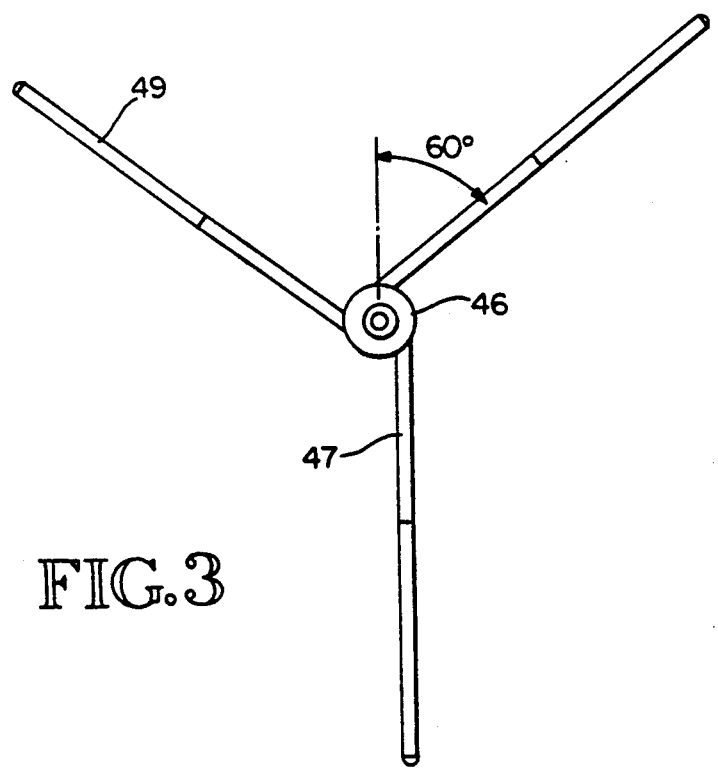
FIG. 3 is a plan view of an embodiment of the invention in which the leg axes make an angle of about 60° with lines radial to the hub center.

FIG. 3 is a plan view of embodiment 2 of the invention with its legs in the extended position, showing how they form an angle of 60° with the radial lines passing through the pivot pins 41.

Figure 4:
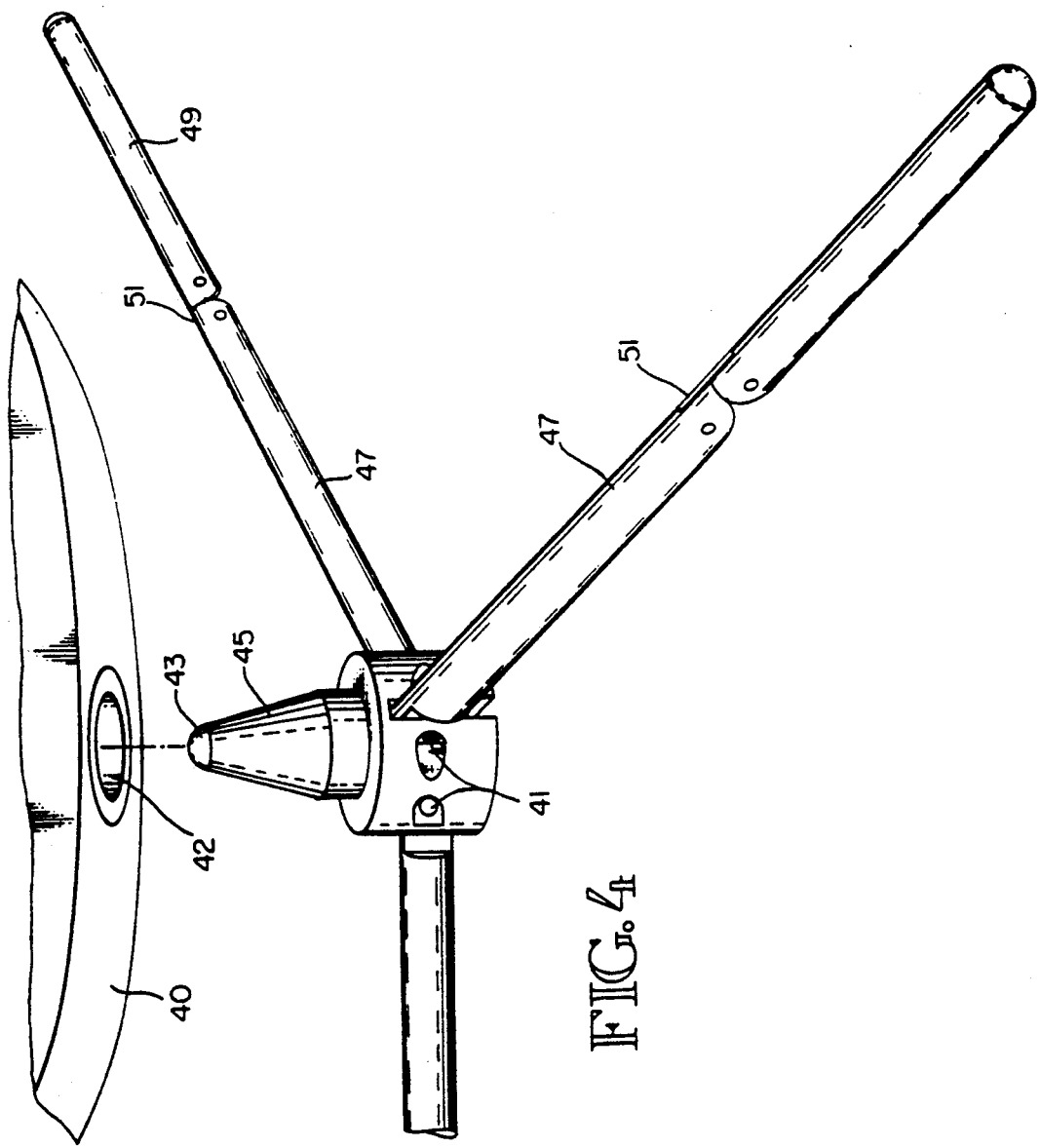
FIG. 4 is a more detailed perspective view of the invention with legs extended, ready to engage a tapered socket in the bottom of a guitar.

FIG. 4 is a perspective view showing a central hub 46 and post 45, with legs extended. Pivotally attached to the hub 46 are three legs, each separated by 120° of arc. The opening of the tapered socket 42 is wide enough to allow easy entry of the tapered post, and the soft post tip 43 prevents the post from accidentally scratching the bottom of the guitar 40. The proximal end of each inner leg segment 47 fits into the slot 44 in the hub, and is attached to the hub 46 by a pivot pin 41. Into a slot in the distal end of the inner leg segment 47 fits a double hinge link 51, which is attached to the inner leg segment 47 by a hinge pin 53. The other end of the double hinge link 51 fits into a similar slot in the proximal end of the outer leg segment 49 and is attached there by another hinge pin 53.

The axis of each hinge pin 53 is always perpendicular to the plane of the double hinge link 51 and perpendicular to the axis of its respective leg segment 47 or 49. In embodiment 1, the plane of each double hinge link 51, and thus the plane of the arc of the outer leg segment, is rotated around the axis of each extended inner leg segment 60° from the vertical. In embodiment 2, the plane of each double hinge link 51 is vertical.

To use the invention, the leg segments are fully extended so they are coaxial and essentially radiate horizontally from the hub. The tripod is then set upon a stable surface. A guitar suitably equipped with a matching tapered socket is then placed upon the post of the tripod, which supports the guitar firmly in an upright position (see FIG. 1).

Figure 5:
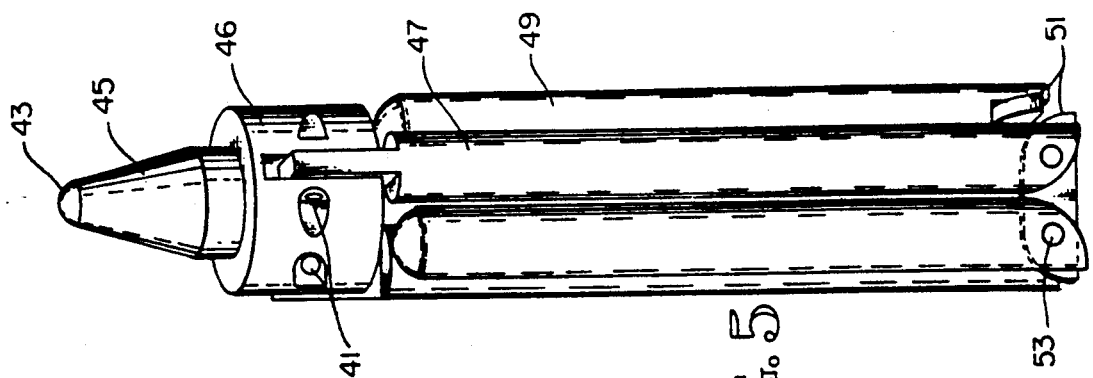
FIG. 5 is a perspective view of the invention with legs folded in a compact hexagonal array.

To fold up the tripod for storage or transportation as shown in FIG. 5, each outer leg segment 49 is folded adjacent and parallel to its respective inner leg segment 47. In embodiment 1, this plane of folding is about 60° from vertical, so the outer leg segment 49 doesn't really fold under its attached inner leg segment 47 as much as it folds next to it. In embodiment 2, this plane of folding is vertical. Then, while keeping the outer leg segments 49 tight against the inner leg segments 47, all three inner leg segments 47 are pivoted vertically downward in relation to the hub 46, resulting, in both embodiments, in all six leg segments being folded upon under the hub 46 in a tight hexagonal array (FIG. 5), minimizing space requirements. Spring-loaded balls acting on detents (not shown) in the pivoting ends of the leg segments give a positive click feel to both the extended and the folded positions.

In an alternative embodiment (not shown), the hub of the tripod features a tapered socket, and the guitar is equipped with a removable or retractable matching tapered post. The guitar thus equipped is then placed into the socket of the tripod, which supports the guitar firmly in an upright position.

In all cases the tripod is designed so that when the legs are fully extended, the bottom of the hub 46 is about ⅛ inch off the floor. Therefore if anyone were to accidentally step on the tripod, the hub 46 would bottom out on the floor before damage to the legs could occur.

SUMMARY, RAMIFICATIONS, AND SCOPE

Accordingly it can be seen that my invention provides a way of supporting a resting guitar in the upright position which is strong and stable, yet folds to a compactness heretofore unknown.

While my above description contains many specifics, these should not be construed as limitations on the scope of the invention, but rather as a means of exemplifying preferred embodiments thereof. Other variations are possible.

Thus, the scope of my invention should not be determined by the embodiments detailed herein, but by the claims and their legal equivalents.

I claim:

1. A compactly folding tripod support system for guitars and the like, comprising a central hub including a conically shaped upper portion becoming narrower toward the top of said central hub, whereby an appropriately modified guitar can removably engage said upper portion, and a cylindrical lower portion housing three pivot pins arrayed approximately one hundred twenty degrees apart from each other near the periphery of said lower portion, the axes of said pivot pins lying in a horizontal plane through said central hub and forming the sides of an equilateral triangle, three legs pivotally connected at their proximal ends to said central hub by said pivot pins and attached to each of said pivot pins such that the longitudinal axis of each of said legs is perpendicular to the axis of said pivot pin, whereby the legs can fold from the nearly horizontally extended position downward through about ninety degrees of arc to a vertical position below said central hub, each of said legs comprising an inner leg segment of enclosed section, the distal end of said inner leg segment housing a hinge pin pivotally joining said inner leg segment to the proximal portion of a hinge link of thin rectangular section, the distal portion of said hinge link pivotally joining the proximal end of an outer leg segment of enclosed section by means of a hinge pin housed in said outer leg segment, said outer leg segment being of approximately the same length as said inner leg segment, said hinge pins being parallel to each other and perpendicular to the plane of said hinge link, said hinge link being oriented such that when said inner and outer leg segments are fully extended, and therefore coaxial, nearly horizontal, and radial from said central hub, the plane of said hinge link includes the coaxial longitudinal axes of said inner and outer leg segments and is inclined sixty degrees from vertical, whereby, upon folding, all six outer and inner leg segments form a tight hexagonal array below said central hub.

2. A compactly folding tripod support system for guitars and the like, comprising a central hub including a conically shaped upper portion becoming narrower toward the top of said central hub, whereby an appropriately modified guitar can removably engage said upper portion, and a cylindrical lower portion housing three pivot pins arrayed approximately one hundred twenty degrees apart from each other near the periphery of said lower portion, the axes of said pivot pins lying in a horizontal plane through said central hub and each of said axes rotated around a vertical axis through the center of each of said pivot pins such that the included angle between the axis of each of said pivot pins and a radial line extending from the center of said central hub through the center of said pivot pin is about thirty degrees, three legs pivotally connected at their proximal ends to said central hub by said pivot pins and attached to each of said pivot pins such that the longitudinal axis of each of said legs is perpendicular to the axis of said pivot pin, such that when said legs are fully extended, and therefore nearly horizontal, the longitudinal axis of each of said legs forms an included angle of about sixty degrees with a radial line extending in the horizontal plane from the center of said central hub through the center of said pivot pin, whereby the legs can fold from the nearly horizontally extended position downward through about ninety degrees of arc to a vertical position below said central hub, each of said legs comprising an inner leg segment of enclosed section, the distal end of said inner leg segment housing a hinge pin pivotally joining said inner leg segment to the proximal portion of a hinge link of thin rectangular section, the distal portion of said hinge link pivotally joining the proximal end of an outer leg segment of enclosed section by means of a hinge pin housed in said outer leg segment, said outer leg segment being of approximately the same length as said inner leg segment, said hinge pins being parallel to each other and perpendicular to the plane of said hinge link, said hinge link being oriented such that when said inner and outer leg segments are fully extended, and therefore coaxial and horizontal, the plane of said hinge link is vertical and includes the coaxial longitudinal axes of said inner and outer leg segments, whereby, upon folding, all six outer and inner leg segments form a tight hexagonal array below said central hub for compact storage.

* * * * *